(12) United States Patent (10) Patent No.: US 8,172,314 B2
Grammer et al. (45) Date of Patent: May 8, 2012

(54) COVERING PART

(75) Inventors: Martin Grammer, Ludwigsburg (DE); Holger Sander, Renningen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 241 days.

(21) Appl. No.: 12/715,569

(22) Filed: Mar. 2, 2010

(65) Prior Publication Data

US 2010/0237660 A1 Sep. 23, 2010

(30) Foreign Application Priority Data

Mar. 21, 2009 (DE) .......................... 10 2009 014 368

(51) Int. Cl.
*B60N 99/00* (2006.01)

(52) U.S. Cl. .................. 296/193.09; 296/208; 362/506; 362/507

(58) Field of Classification Search ............. 296/193.05, 296/193.09, 208; 362/506, 507
See application file for complete search history.

(56) References Cited

U.S. PATENT DOCUMENTS 6,071,000 A   6/2000   Rapp
2002/0121357 A1   9/2002   Berne et al.
2009/0303740 A1*   12/2009   Soellner et al. ............... 362/507

FOREIGN PATENT DOCUMENTS

| DE | 3138360 | 4/1983 |
|---|---|---|
| DE | 37 01 736 | 8/1988 |
| DE | 19838950 | 3/2000 |
| DE | 19929245 | 12/2000 |
| DE | 103 07 979 | 9/2003 |
| DE | 10 2005 042 688 | 3/2007 |
| EP | 1762428 | 3/2007 |
| FR | 2804745 | 8/2001 |
| GB | 2069120 | 8/1981 |

* cited by examiner

*Primary Examiner* — Lori Lyjak
(74) *Attorney, Agent, or Firm* — Gerald E. Hespos; Michael J. Porco

(57) ABSTRACT

A motor vehicle has a wing (3) with a cutout (16) and a covering part for covering the cutout (16). The covering part is formed by a panel (10) that is visible from outside and by a closing part (11) that holds the panel (10) from the inside against the cutout (16). To further increase the functionality of the covering part a connection in terms of flow extends between the closing part (11) and/or the panel (10) and headlight unit/lamp unit (2).

9 Claims, 3 Drawing Sheets

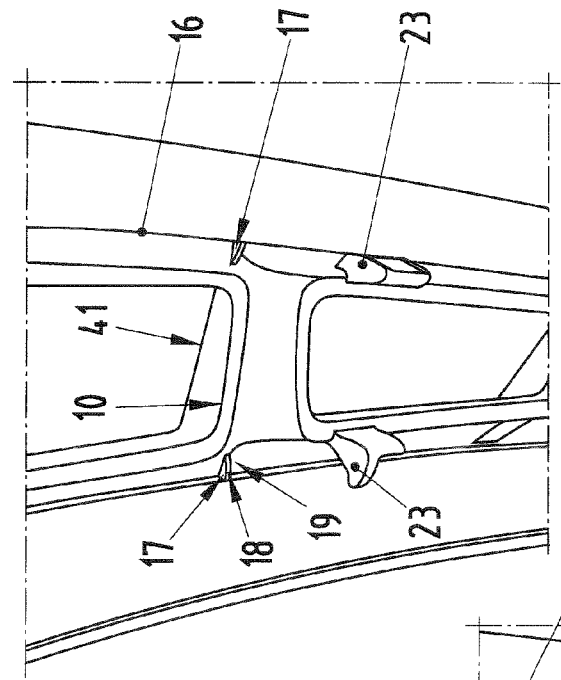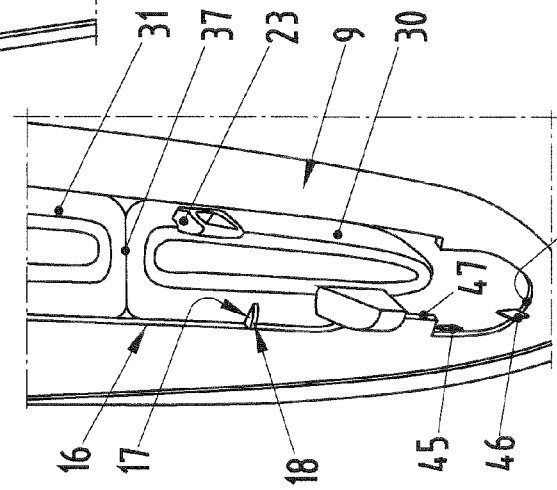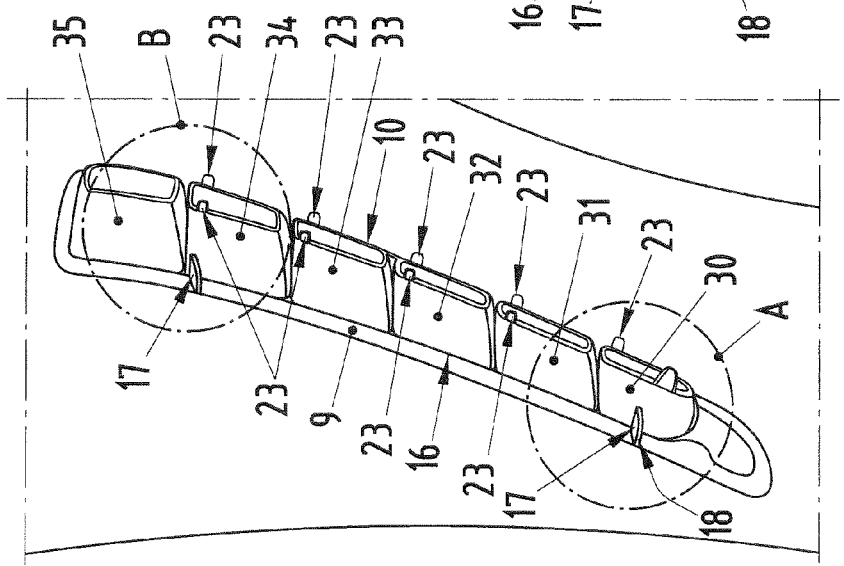

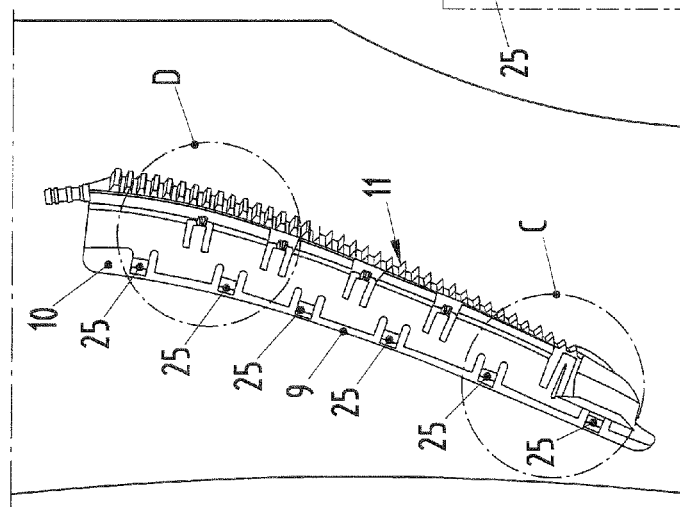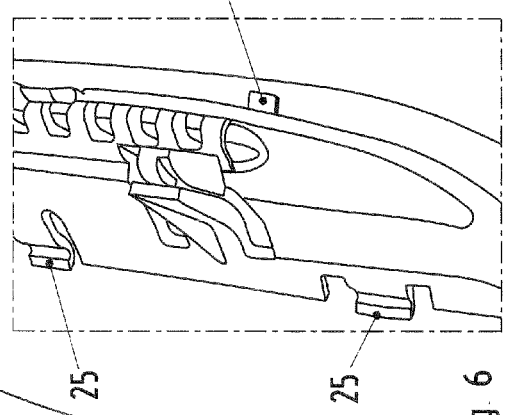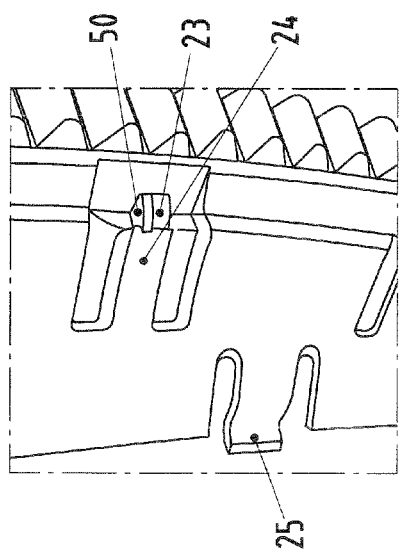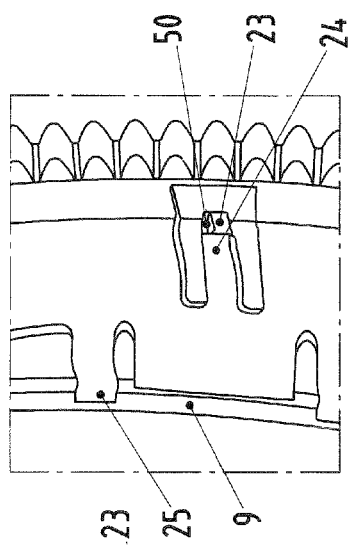

COVERING PART

CROSS-REFERENCE TO RELATED APPLICATIONS

This application claims priority under 35 USC 119 to German Patent Application No. 10 2009 014 368.8 filed on Mar. 21, 2009, the entire disclosure of which is incorporated herein by reference.

BACKGROUND OF THE INVENTION

1. Field of the Invention

The invention relates to a covering part for a motor vehicle with a wing.

2. Description of the Related Art

It is known from the series manufacturing of vehicles to provide a cutout in the wing behind the wheelhouse. The cutout is covered decoratively by a covering and is provided for ventilating driving engines, for example internal combustion engines.

DE 10 2005 042 688 A1 discloses integrating an indicator or the like into the covering part.

The object of the invention is to further increase the functionality of a covering part of this type.

SUMMARY OF THE INVENTION

The invention uses the pressure difference between a separation edge of a cutout in a wing and the pressure prevailing at a headlight unit or other illumination system mounted upstream in the direction of travel. For this purpose, a covering covers the cutout and is connected in terms of flow to the headlight unit, for example via a ventilation hose. A greater pressure prevails at the inflow opening in the headlight unit than at the cutout in the wing during the driving mode. The pressure difference is sufficient to minimize a misting of the headlamp and to accelerate thawing/ventilation.

In a preferred refinement of the invention, the connection in terms of flow can be produced by a hose that connects a connecting piece on the closing part to the ventilation opening on the headlight unit.

The closing part and the panel can form a channel in the vicinity of the connecting piece to assist the flow from the ventilation opening to the separation edge.

For manufacturing reasons, the border region of the wing that forms the cutout can be formed by a peripheral embossment. Therefore, the peripheral border region of the panel can bear against the embossment in the fitted position.

X-positioning ribs that permit reproducible installation can be provided for positioning the panel in the longitudinal direction of the vehicle.

Furthermore, Z-positioning ribs that interact with corresponding stops of the cutout and prevent a displacement in the vertical direction of the vehicle can be provided for positioning the panel in the vertical direction of the vehicle.

For tool-free installation, the closing part may be latched by connecting holding tabs of the closing part to latching hooks of the panel.

An advantageous refinement of the invention is explained in more detail below with reference to the drawing.

BRIEF DESCRIPTION OF THE DRAWINGS

FIG. 2 shows a view of the rear side of the wing according to FIG. 1 with a panel inserted into the cutout in an embossment.

FIG. 3 shows a detail A according to FIG. 2.

FIG. 4 shows a detail B according to FIG. 2.

FIG. 5 shows a view of the rear side of the wing according to FIG. 1 with the panel and closing part inserted.

FIG. 6 shows a detail C according to FIG. 5.

FIG. 7 shows a detail D according to FIG. 5 in a latched fitted position.

FIG. 8 shows the detail D according to FIG. 7 in the removal position.

DETAILED DESCRIPTION OF THE PREFERRED EMBODIMENT

Figure 1:
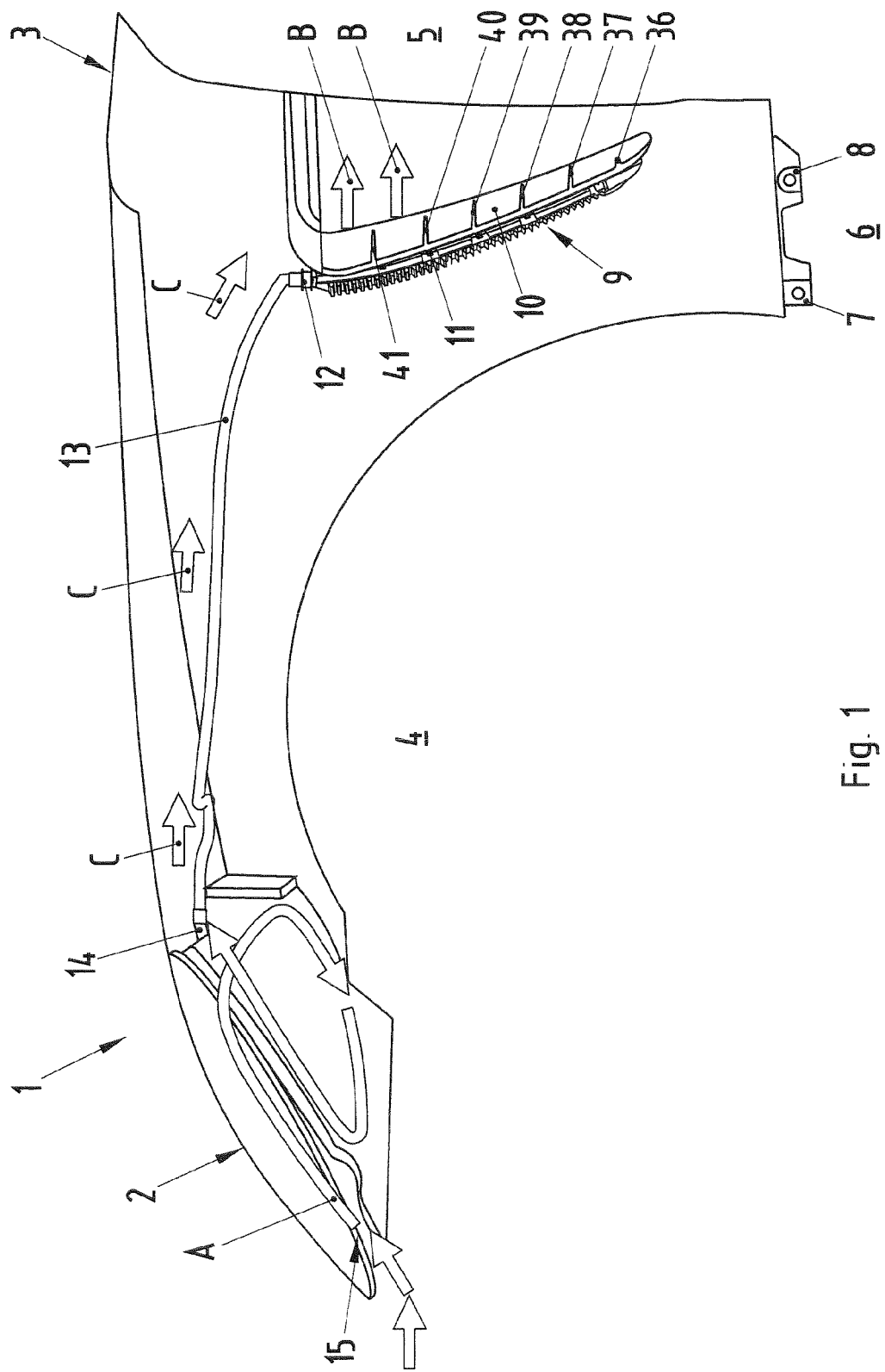
FIG. 1 shows a side view of a front end of a motor vehicle.

FIG. 1 shows a side view of a front end 1 of a motor vehicle (not illustrated further). A headlight unit 2 is arranged in the front region of the front end 1. A wing 3 is connected behind the headlight unit 2. The wing 3 extends over a wheelhouse 4 as far as the A pillar 5 (not illustrated). A lower part of the wing 3 is connected to the door sill 6 by means of two fastening tabs 7 and 8.

An elongate embossment 9 with a cutout (not visible in FIG. 1) is provided in the wing 3 behind the wheelhouse 4 and is covered decoratively by a panel 10.

A closing part 11 holds the panel 10 on the cutout in the embossment 9. The configurations of the panel 10 and the closing part 11 and the installation thereof are discussed in more detail below.

A connecting piece 12 is provided on the upper end of the closing part 11 and preferably is formed integrally thereon.

The connecting piece 12 can be adjoined by a flexible hose 13 or a shaped tube, which, in turn, is connected to a ventilation opening 14 in the headlight unit 2. The headlight unit 2 also has an air inlet opening. To minimize misting within the headlight unit, it is desirable for air to flow through the headlight unit 2 from the air inlet opening 15 to the ventilation opening 14 in the direction of the arrow A.

The separation edge formed by the embossment 9 causes a negative pressure to be produced in the region of the embossment 9 during movement of the motor vehicle. The negative pressure is illustrated schematically by arrows B. A higher pressure is produced in the driving mode at the front air inlet opening 15 on the headlight unit 2. The resultant pressure difference between the air inlet opening 15 and the embossment 9 is used to generate a flow of air in the hose 13 in the direction of the arrow C so that air flows through the headlight unit 2 in the direction of the arrow A. It has been shown that the throughflow is sufficient to effectively minimize misting of the headlight unit from the inside.

The installation of the panel 10 and the closing part 11 is explained in more detail below with reference to FIGS. 2 to 8.

As mentioned above, the embossment 9 comprises a cutout 16. A fitter inserts the panel 10 into the cutout 16 in the embossment 9 from the outside. The panel 10 has hollow profiles 30 to 35 that are arranged one above another and adjoin one another. The hollow profiles 30 to 35 are connected to one another by a peripheral frame 36 that bears against the embossment 9. The hollow profiles 30 to 35 are separated from one another by ribs 37 to 41.

X-positioning ribs 17 are provided on the panel 10 to position the panel 10 in the longitudinal direction (X) of the vehicle. Each positioning rib 17 has a run-on slope 18 and a latching lug 19. Upon insertion, the run-on slope 18 is pushed over the edge of the cutout 16 and latches behind the edge of the cutout 16 by means of the latching lug 19.

Upper and lower Z-positioning ribs 45 and 46 are provided on the panel 10 and limit displacement of the panel 10 in the vertical direction (Z) of the vehicle. The upper and lower Z-positioning rib 45 and 46 interact with stops 47 and 48 formed on the cutout 16.

Latching hooks 23 protrude from the rear side of the panel 10 in the direction of the closing part 11. The closing part 11 together with the panel 10 forms, at least in the upper region, a channel that opens out in the connecting piece 12. Holding tabs 24 are provided for fastening the closing part 11 to the panel 10. The holding tabs 24 correspond to the latching hooks 23 are provided and are held in the fitted position by the latching hooks 23. The latching hooks 23 are provided on one side with a lug 50 that engages behind the holding tab 24 in the fitted position (cf. FIG. 7) to ensure secure latching of the closing part 11 on the panel 10.

Flexible supporting feet 25 are provided on the side of the closing part 11 that faces the cutout 16 to compensate for tolerances in the longitudinal direction (X) of the vehicle. The supporting feet are supported against the embossment 9 upon latching.

The latching hooks 23 of the panel 10 are formed only on one side with a lug 50. The lugs 50 come out of engagement with the holding tab 24 of the closing part 11 by displacing the closing part 11 vertically downwards. The closing part 11 subsequently can be removed counter to the direction of travel (X). It is therefore possible for the closing part 11 to be removed without being destroyed.

What is claimed is:

1. A motor vehicle comprising:
    a headlight unit or lamp unit in proximity to a front end of the motor vehicle;
    a wing rearward of the headlight unit or lamp unit, the wing having a cutout;
    a covering part for covering the cutout in the wing, the covering part including a panel that is visible from outside the motor vehicle and a closing part that holds the panel from inside against the cutout; and
    an air flow connection extending between the headlight unit or lamp unit and the closing part or the panel.

2. The motor vehicle of claim 1, wherein the air flow connection is a hose or a shaped tube connected to a connecting piece of the covering part and to a ventilation opening in the headlight unit or lamp unit.

3. The motor vehicle of claim 2, wherein the connecting piece is provided on the closing part.

4. The motor vehicle of claim 3, wherein the closing part and the panel form a channel at least in the vicinity of the connecting piece.

5. The motor vehicle of claim 1, wherein the wing has an embossment around a border region that forms the cutout.

6. The motor vehicle of claim 5, wherein the panel has a peripheral border region that bears against the embossment when the panel is in a fitted position on the wing.

7. The motor vehicle of claim 6, wherein X-positioning ribs are provided for positioning the panel in the longitudinal direction of the vehicle.

8. The motor vehicle of claim 7, wherein Z-positioning ribs are provided for positioning the panel in the vertical direction of the vehicle.

9. The motor vehicle of claim 1, wherein the closing part has holding tabs and the panel has latching hooks that latch to the holding tabs of the closing part.

* * * * *